(12) United States Patent
Koselka et al.

(10) Patent No.: US 7,898,569 B2
(45) Date of Patent: *Mar. 1, 2011

(54) ANGLED AXIS MACHINE VISION SYSTEM AND METHOD

(75) Inventors: Harvey Koselka, Trabuco Canyon, CA (US); Bret Wallach, San Diego, CA (US)

(73) Assignee: Vision Robotics Corporation, San Diego, CA (US)

( * ) Notice: Subject to any disclaimer, the term of this patent is extended or adjusted under 35 U.S.C. 154(b) by 988 days.

This patent is subject to a terminal disclaimer.

(21) Appl. No.: 11/675,263

(22) Filed: Feb. 15, 2007

(65) Prior Publication Data

US 2007/0195160 A1 Aug. 23, 2007

Related U.S. Application Data

(63) Continuation of application No. 10/710,512, filed on Jul. 16, 2004, now Pat. No. 7,196,719.

(51) Int. Cl.
  *H04N 7/18* (2006.01)
  *H04N 13/00* (2006.01)
  *H04N 15/00* (2006.01)

(52) U.S. Cl. .......................................... 348/139; 348/42

(58) Field of Classification Search ................... 348/42, 348/51–60, 139; 382/154
See application file for complete search history.

(56) References Cited

U.S. PATENT DOCUMENTS 1,505,268 A   8/1924  Larson
4,654,872 A   3/1987  Hisano
5,198,876 A   3/1993  Anezaki
5,249,035 A   9/1993  Yamanaka
5,475,422 A   12/1995 Mori
6,392,688 B1  5/2002  Barman
6,595,704 B2  7/2003  Ambrose
2003/0016661 A1  1/2003  Emerson
2005/0237385 A1* 10/2005 Kosaka et al. ................. 348/42

FOREIGN PATENT DOCUMENTS

JP     2004-198732     7/2004

* cited by examiner

*Primary Examiner*—Marsha D Banks Harold
*Assistant Examiner*—Jeremaiah C Huber
(74) *Attorney, Agent, or Firm*—ARC IP Law, PC; Joseph J. Mayo

(57) ABSTRACT

Angled axis machine vision system having a camera system angled with respect to an axis of coordinate system of environment. Eliminates problem of utilizing horizontal, vertical lines in environment for distance calculations when horizontal and vertical lines are parallel or close to parallel to axis lying between camera centers of camera system. With camera centers angled about roll axis, horizontal and vertical lines in environment appear as angled lines in images taken from the cameras enabling more accurate distance calculations. With angled axis rotation it is still possible for lines in environment to be parallel to axis defined between camera centers, but instances are rare in real world environments. Camera mount may rotate wherein two sets of pictures are taken and two sets compared for the number of lines which are parallel to axis of camera centers wherein set of pictures with least lines parallel is used for distance calculations.

10 Claims, 7 Drawing Sheets

ANGLED AXIS MACHINE VISION SYSTEM AND METHOD

This application is a continuation of U.S. patent application Ser. No. 10/710,512 entitled "Angled Axis Machine Vision System and Method" filed Jul. 16, 2004 now U.S. Pat. No. 7,196,719, the specification of which is hereby incorporated herein by reference.

BACKGROUND OF THE INVENTION

1. Field of the Invention

Embodiments of the invention described herein pertain to the field of machine vision systems. More particularly, but not by way of limitation, these embodiments yield improved calculation of distance in environments comprising substantially horizontal and substantially vertical features through use of stereo digital cameras that are rotated in at least one axis comprising at least the roll axis.

2. Description of the Related Art

Machine vision systems allow computers to view the physical world. A machine vision system comprises at least one camera coupled with a computer. A computer is used to interpret an image taken from a camera thereby enabling a machine vision system to perform various tasks. Tasks performed by machine vision systems are diverse and include distance estimation that is used in applications involving robot navigation. The use of two cameras in order to calculate a distance to an object is known as binocular or stereo machine vision. Because of their inexpensive price and richness of data, CMOS and CCD cameras are used for machine vision applications such as robot navigation that make use of a three dimensional image of an object or an environment in which a robot is situated.

Sensors such as ultrasonic, radar and lidar are used to actively sense the environment. Active sensors transmit a signal and analyze the reflection of that signal. Cameras are passive sensors that require a more intricate analysis of data obtained from the camera to map an image as compared to active sensors. According to Computer Vision, Three-Dimensional Data from Images by Klette, Schluns and Koschan, binocular stereo vision is a process that transforms two images seen from slightly different viewpoints into a perception of the three-dimensional space. Hence, the use of stereo digital cameras is of great interest for machine vision systems.

Stereo machine vision, or stereovision, involves the use of two or more cameras separated from each other to view an object or environment. Features comprise points on objects, edges or other visible markings. Features as seen by digital cameras are located in different relative positions in the images, depending on their orientations and distance from the cameras. The difference of a feature's location in two images is called the feature's pixel disparity or disparity. The position of a feature in three-dimensional real world coordinates is determined by the feature's disparity and the camera specifications and geometry.

Two key technical aspects of stereovision analysis techniques involve methods to determine the points in two images that correlate with one another and to determine where the point is in the physical world with as much accuracy as possible.

There are many known methods for matching features between images. A feature is otherwise known as a point of interest. Example methods for matching points of interest include pixel-by-pixel correspondences and disparities; image patch correlation that divides one image into rectangular patches of pixels and then searches for similar patches in the other image; shading and gradient analysis; edge detection and matching; and object matching. Various combinations of these approaches can also be used. Once features are matched, the feature disparities can be calculated. There are many texts that describe the geometry to determine the position of a feature based on the disparity between the images.

As the measured accuracy of the stereo geometry or the feature's pixel disparity decreases, so does the accuracy of the relative position of the feature in three-dimensional space. Any feature in one image that can be matched with several features in the other image is problematic and either must be ignored or leads to low accuracy for the estimate of the feature's three-dimensional position. It is therefore desirable to minimize the number of this type of feature that appears in typical environments.

The type of feature that is the most problematic is any line that is parallel to the axis defined in the direction between the camera centers. This is because every portion of the line in the first image matches every portion of the line in the second image equally well so the match is completely ambiguous and unusable. Lines that are not quite parallel to the line between the camera centers are also problematic. While there is a theoretical best match, slight problems such as lighting discontinuities render these lines that are close to parallel unusable. It is easy to mismatch lines that are nearly parallel to the cameras and such a mismatch results in a feature location estimate which is erroneous which is worse than not using the feature location estimate at all.

Most stereo camera systems consist of two horizontal coplanar cameras. Vertical coplanar cameras also exist but are less common. Researchers have also experimented with "Trinocular" systems, stereovision using three cameras. In these systems, the cameras are typically mounted on the same plane either with all three cameras mounted along one axis or in a right angle configuration with two cameras mounted side-by-side and the third camera mounted vertically above one of the other two.

These vertical and horizontal mounting configurations are the standard used in all machine vision systems. In addition to providing the simplest geometry, these configurations mimic nature; human eyes are essentially mounted horizontally on a planer surface. Camera images are typically rectangular, and the planer-horizontal configuration aligns well with typical coordinate systems.

The world contains many horizontal lines, particularly in indoor environments. These include moldings and horizontal edges to doors, windows and furniture. These objects are very strong features that would greatly aid in the motion of mobile robots, but are unusable by a vision system with cameras configured horizontally. Using a vertical camera orientation makes it virtually impossible to correlate features on vertical lines. This includes corners between walls, and vertical legs on furniture. Trees and other plants contain many vertical edges in outdoor environments.

These systems and methods fail to utilize the correlation of strong features such as horizontal and vertical lines to simplify the correlation of features between images in a stereovision system and are therefore limited in their ability to estimate distances.

BRIEF SUMMARY OF THE INVENTION

Embodiments of the invention comprise an angled axis machine vision system having a camera system angled with respect to an axis of the coordinate system of the environment. This configuration has all of the advantages of the horizontal alignment while eliminating the inherent problem of utilizing horizontal and vertical lines in an environment for distance calculations when the horizontal and vertical lines are parallel or close to parallel to an axis lying between camera centers of the camera system. With the camera centers angled about the roll axis, horizontal and vertical lines in the environment appear as angled lines in images taken from the cameras enabling more accurate distance calculations. With angled axis rotation it is still possible for lines in the environment to be parallel to the axis defined between the camera centers, but these instances are rarer than horizontal or vertical lines in real world environments. Embodiments of the invention may comprise a camera mount that is rotatably mounted to a support wherein two sets of pictures from each of the cameras may either be utilized wherein each set of pictures may be taken from a different roll angle for example. Embodiments of the invention may comprise more than one pair of cameras mounted at different angles with respect to each other in any axis. In embodiments employing more than one pair of cameras, images may be sampled in any order from each camera including simultaneously. In one embodiment the two sets are compared for the number of lines which are parallel to the axis of the camera centers and the set of pictures with the least lines parallel is used for distance calculations. In another embodiment for example the two sets of images may be completely analyzed with or without use of lines parallel to the axis of the camera centers to correlate the distances derived from each set of pictures.

In addition to rotating the cameras about an axis parallel to the ground, i.e., the roll axis, the stereo camera system may also be pitched up or down about the pitch axis. In a mobile robot, pitching the cameras downward enables a robot to view the ground directly in front of the robot close to its base.

In one embodiment, the cameras are mounted parallel to the ground, but are rotated 36.9 degrees from horizontal. Standard CMOS and CCD cameras have a 4:3 aspect ratio (640:480). Rotating the cameras 36.9 degrees aligns the diagonal of the camera images with real worlds' horizon. Thus the cameras give the widest horizontal viewing angle with respect to the ground. "Substantially 37 degrees" means any mounting angled to take advantage of the diagonal of a 4:3 aspect ratio camera that is in keeping with the spirit of the invention, namely between purely horizontal and purely vertical, or 0 and 90 degrees but closer to 37 degrees than 45 or 29 degrees.

In another embodiment, the cameras are parallel to the ground and rotated 45 degrees. A 45-degree orientation optimally rotates the cameras and, thus, the line between the camera centers is not parallel to either the horizontal and vertical lines in the environment. Additionally, after horizontal and vertical, 45-degree angles are the most common and are easy for people to envision, design and manufacture. "Substantially 45 degrees" means any mounting angled to take advantage of the diagonal of a 1:1 aspect ratio camera that is in keeping with the spirit of the invention, namely between purely horizontal and purely vertical, or 0 and 90 degrees but closer to 45 degrees than 37 or 29 degrees.

In another embodiment, the cameras are parallel to the ground and rotated 29.4 degrees. A 29.4-degree orientation optimally rotates cameras with 16:9 aspect ratio and thus, the line between the camera centers is not parallel to either the horizontal and vertical lines in the environment. "Substantially 29 degrees" means any mounting angled to take advantage of the diagonal of a 16:9 aspect ratio camera that is in keeping with the spirit of the invention, namely between purely horizontal and purely vertical, or 0 and 90 degrees but closer to 29 degrees than 37 or 45 degrees.

Another embodiment of the invention provides for an adjustable mounting angle between 0 and 90 degrees for environments that comprise environmental lines other than horizontal and vertical. The angle may be rotatable altered in embodiments of the invention employing rotatable mounting of the camera mount in order to minimize processing and error in distance calculations. The rotating of the camera mount may be performed if error estimates are too large for example. Taking one set of images from the cameras and rotating the camera mount followed by taking another set of images from an alternate angle may be used to determine the best set of images to use, for example the image set with the fewest lines parallel to the axis defined along the camera centers, or to correlate distance calculations from both sets of images. These techniques may be utilized in environments where movement of an associated robot and collision avoidance is critical, for example in a nuclear power plant.

DETAILED DESCRIPTION OF THE INVENTION

Embodiments of the invention comprise an angled axis machine vision system having a camera system angled with respect to an axis of the coordinate system of the environment. This configuration has all of the advantages of the horizontal alignment while eliminating the inherent problem of utilizing horizontal and vertical lines in an environment for distance calculations when the horizontal and vertical lines are parallel or close to parallel to an axis lying between camera centers of the camera system. With the camera centers angled about the roll axis, horizontal and vertical lines in the environment appear as angled lines in images taken from the cameras enabling more accurate distance calculations. With the camera centers angled downward about the pitch axis objects that are near are more readily observed. With angled axis rotation it is still possible for lines in the environment to be parallel to the axis defined between the camera centers, but these instances are rarer than horizontal or vertical lines in real world environments. Embodiments of the invention may comprise a camera mount that is rotatably mounted to a support wherein two sets of pictures from each of the cameras may either be utilized. In one embodiment the two sets are compared for the number of lines which are parallel to the axis of the camera centers and the set of pictures with the least lines parallel is used for distance calculations. In another embodiment, the two sets are utilized to correlate the distances derived from each set of pictures.

In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Any mathematical references made herein are approximations that can in some instances be varied to any degree that enables the invention to accomplish the function for which it is designed. In other instances, specific features, quantities, or measurements well-known to those of ordinary skill in the art have not been described in detail so as not to obscure the invention. Readers should note that although examples of the invention are set forth herein, the claims, and the full scope of any equivalents, are what define the metes and bounds of the invention.

Figure 1A:
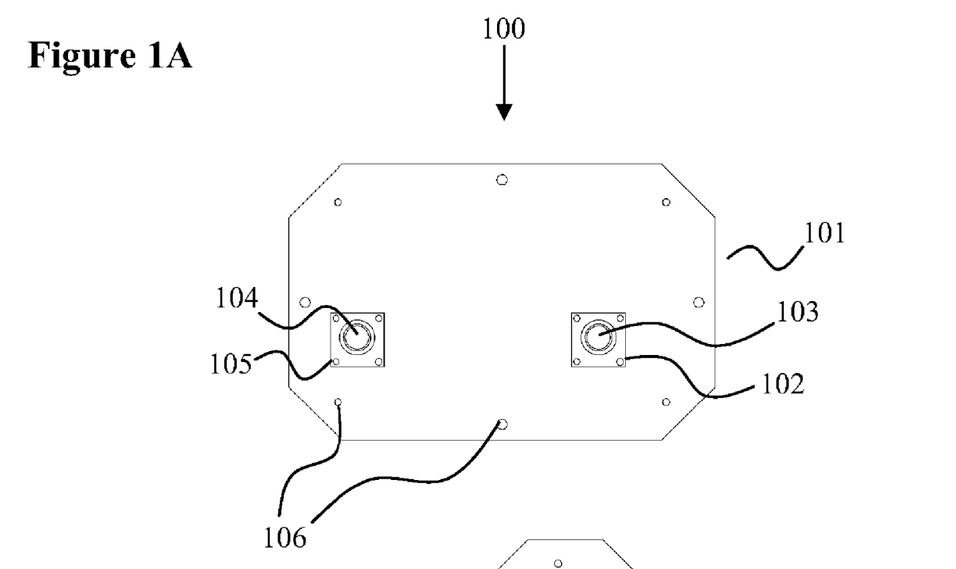
FIG. 1A is a drawing of a stereovision set of cameras and lens mounted on printed circuit board in standard horizontal configuration.

FIG. 1A shows stereo camera system 100 comprising a camera mount 101 in the typical horizontal orientation. The camera mount may comprise for example a printed circuit board (PCB). The cameras for example may be CMOS based. In one embodiment where camera mount 101 comprises PCB, the PCB may be a 0.06" thick, two-layer layer board that contains camera chips, a micro-processor or digital signal processors for analyzing the image, memory, support circuitry and devices utilized in communicating with the remainder of the machine vision system. Lenses 103 and 104 and lens holders 102 and 105 cover camera chips (not shown for ease of illustration). If desired, camera mount 101 may be mounted into a support such as for example a robot or any other machine vision system using mounting holes 106.

From the perspective of the cameras, the left camera, left lens 103 and left lens holder 102 are mounted on the same plane as and horizontal to and a known distance from the right camera, right lens 104 and right lens holder 105. In reality, there may be slight variations in the alignment between the left and right camera assemblies. These distortions, and those caused by the inconsistencies by the lenses themselves (i.e. a "fish-eye" effect), may be calibrated out of the system using algorithms such as described by Moravec, CMU Robotics Institute Technical Report CMU-RI-TR-96-34, September 1996. At the end of this process, the camera system closely approximates the standard stereo geometry with coplanar cameras with collinear horizontal centerlines.

Figure 1B:
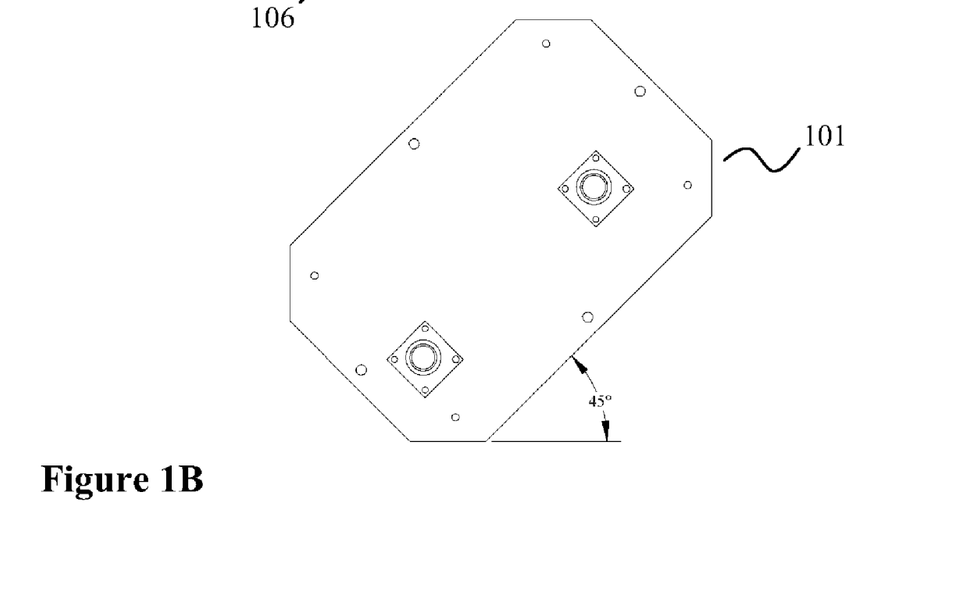
FIG. 1B is a drawing of a stereovision set of cameras and lens mounted on printed circuit board in angled roll axis configuration.

FIG. 1B shows an embodiment where camera mount 101 is mounted at angle relative to the horizon, i.e., rotated through the roll axis. In this embodiment, the angle of axial rotation is for example 45-degrees although any angle between 0 and 90 degrees may be utilized. For environments where many lines exist or where distance calculations are determining possibility of inaccuracies, rotation of the camera system about at least the roll axis may be performed dynamically. Angling the roll axis dynamically and re-estimating distances may be repeated until error estimation for selected features is calculated to be beneath a threshold or until a configured time has elapsed for example. Alternatively a set of pictures may be discarded if there are too many ambiguities in distance and a plurality of picture sets may be utilized to correlate distance estimates to objects.

Figure 2:
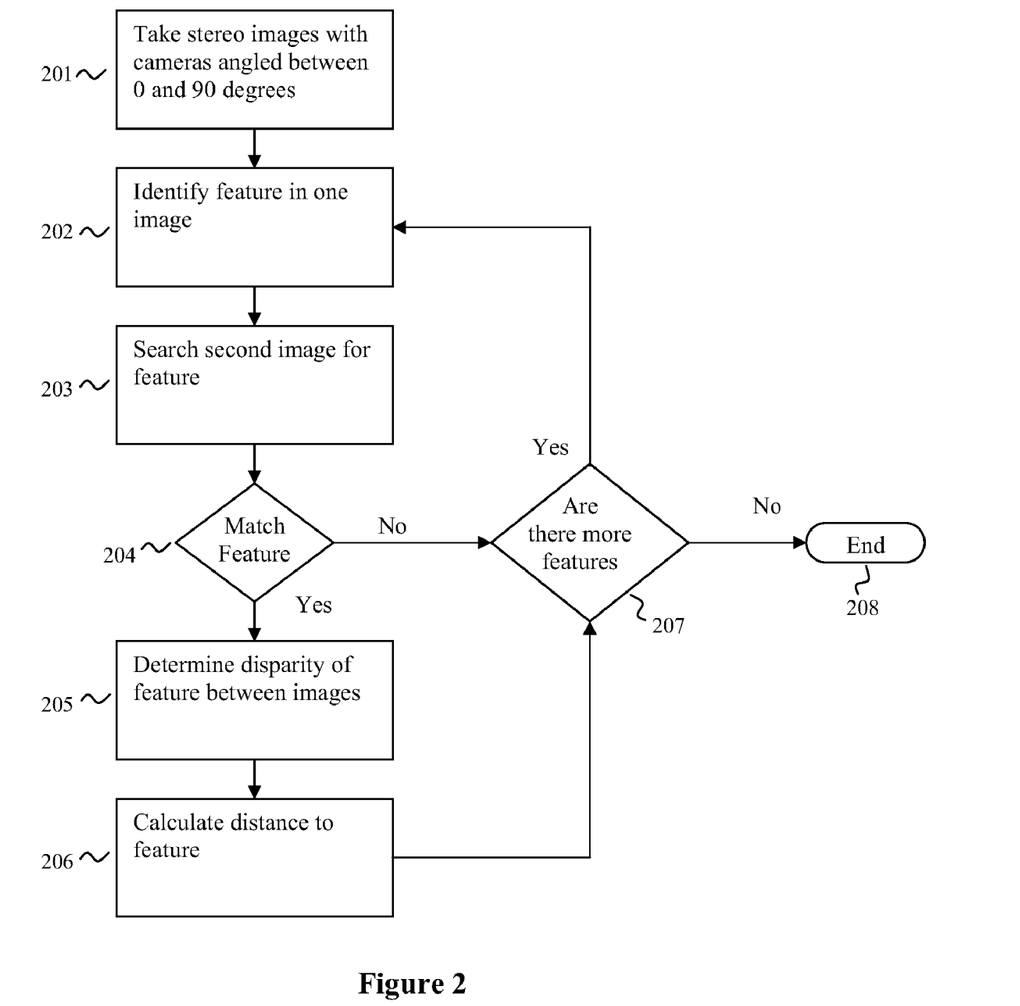
FIG. 2 is a flow chart for feature detection in a stereovision system utilized in an embodiment of the invention.

FIG. 2 is a flow chart for a feature mapping algorithm for an embodiment of the invention. The process begins by acquiring an angled stereo image of a scene at 201. In one embodiment, each of a pair of stereo cameras mounted on a robot simultaneously takes a picture. The system may choose one of the images as the base image, in which it will search for a feature at 202. A feature may be a discontinuity between adjacent pixels within the scene and may be based on luminance, color or any other parameter derived from the picture. When a feature has been identified in the base image, the computer system will search the second image to locate the same feature at 203. This process may involve comparing a set of pixels around the feature to each pixel and the set of pixels surrounding it along the epipolar line in the other image until it finds the best match at 204. Once the feature is matched, the system may determine the disparity between its locations in each image at 205. The disparity is used to calculate the distance to the feature at 206. This process repeats at 207 until the system either has identified each feature in the base image or until it determines it has identified a sufficient number of features to complete its task at 208. Optionally, the entire process can be repeated after rotating PCB 101 to a differing roll angle in order to re-calculate distances to selected features, for example if too many ambiguities exist or if verification through correlation of feature distances is desired.

Figure 3:
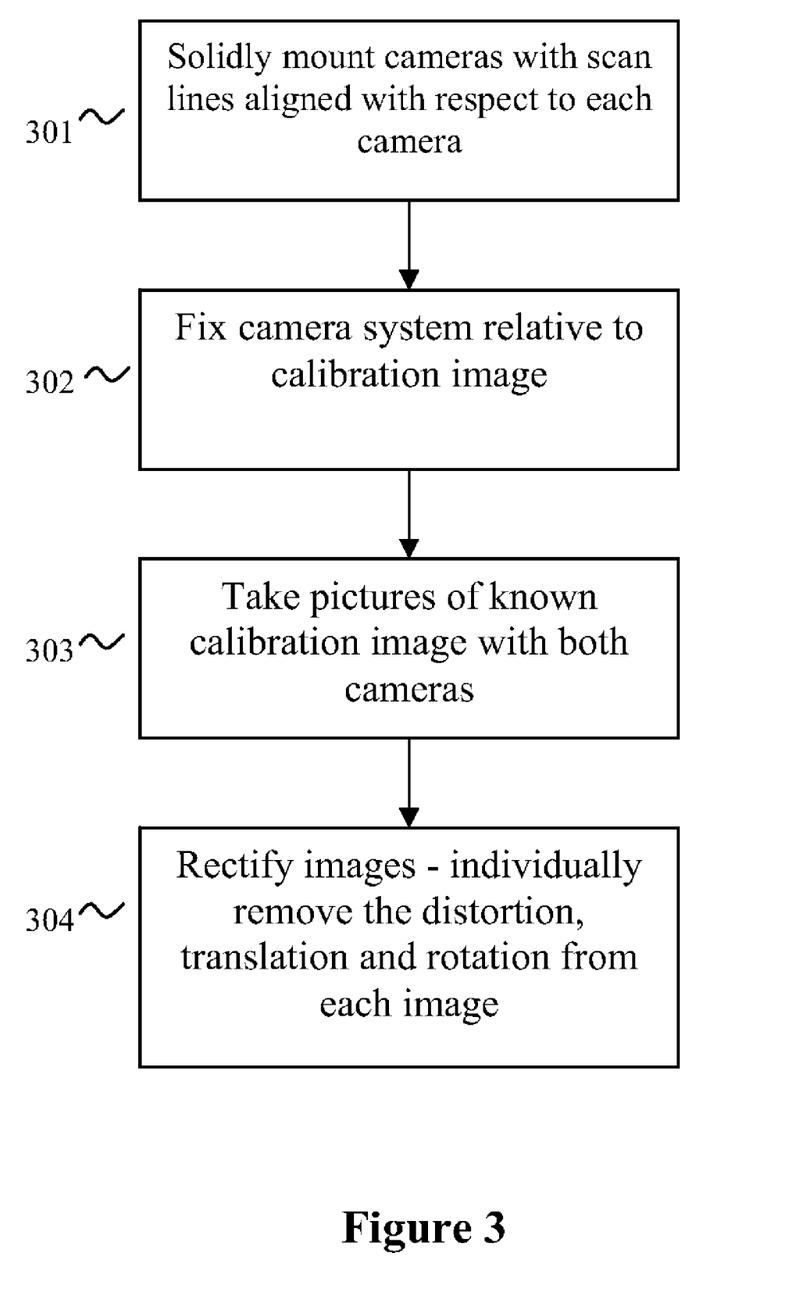
FIG. 3 is a flow chart for calibrating a stereovision camera system in accordance with an embodiment of the invention.

In one embodiment, the stereo camera system is calibrated to remove image distortion such as the fish-eye effect caused by wide-angle lenses. The calibration also removes distortions caused by camera and mounting variations. The end result of the calibration is a mapping of input pixel positions in the uncalibrated image to output positions in a calibrated and rectified image for each camera. This process is shown in FIG. 3. In one embodiment, the stereo cameras are solidly and rigidly mounted co-planar, with the scan lines aligned at 301. The camera pair may be mounted in known relative positions with a known distance and orientation from a known calibration image 302. The cameras simultaneously take pictures of the known image at 303. Alternatively, the cameras may sequentially take pictures of the calibration image at any interval since the camera mount may be configured to comprise a static distance between cameras. If at least one of the cameras is mounted to move along the axis defined between the cameras then calibration may be performed at the maximum and minimum separation between the cameras and utilized in the calibration process. Such a mounting could for example be used in environments with requirements for distance estimation wherein the environment comprises a large disparity in the object sizes and distances.

The images are transferred to the calibration system comprising a computer program run on a microprocessor. The microprocessor may be a remote computer either networked to the cameras via a wired or wireless network. Alternatively, the camera system may include a microprocessor or DSP that performs the calibration. Any other means, such as a person physically transferring the images via a floppy disk are also possible. The system then calculates the mapping between each pixel in the distorted, translated, and rotated input image and the rectified image at 304.

Figure 4:
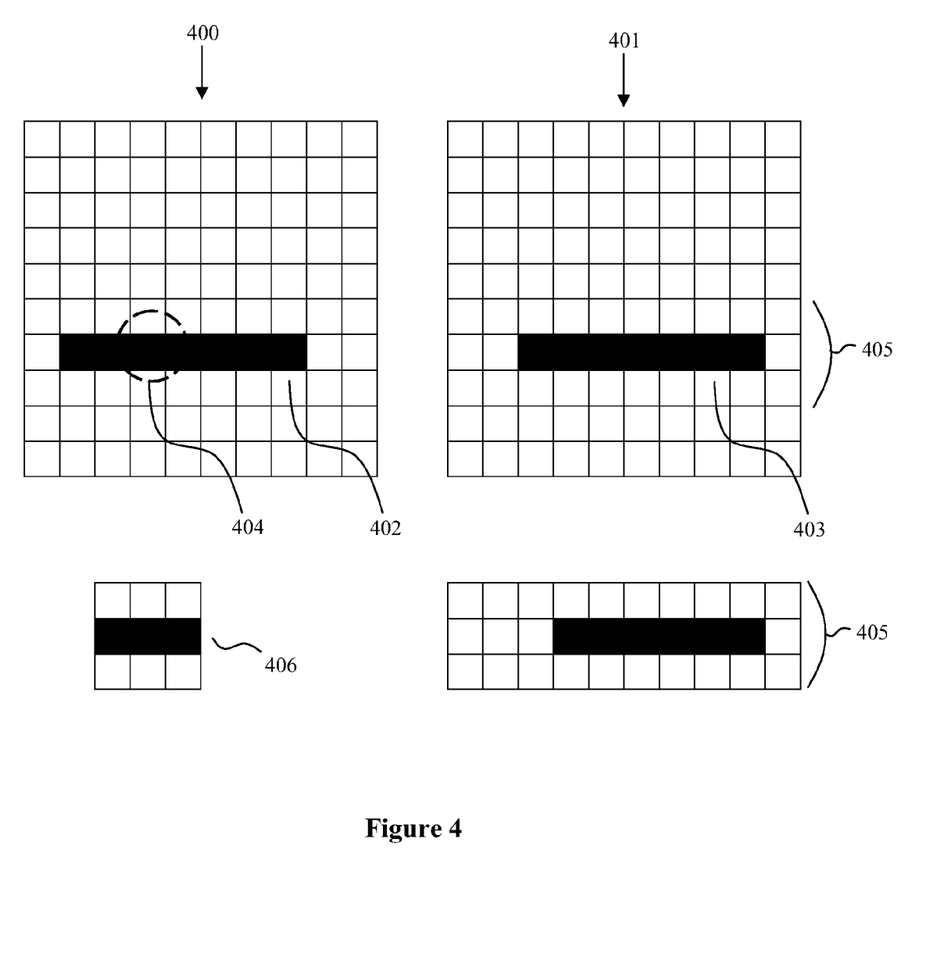
FIG. 4 shows image pixels of a horizontal line taken by a stereovision system employing a standard horizontal camera alignment.

FIG. 4 shows an example where the entire image is a single horizontal line 7 pixels long as taken by a stereovision set of cameras and lens mounted on a camera mount in standard horizontal configuration as shown in FIG. 1A. FIG. 4 shows the scene both as seen by a left camera as per image 400 and right camera as per image 401. Line 402 in the left image 400 is shifted one pixel to the left of line 403 in the right image 401. The pixel shift is the actual disparity for the line between the images. One technique for the image processing system to determine the disparity is to select features in one image and then attempt to match the feature to a specific pixel in the other image. In this example pixel 404 has been selected for feature correlation.

One method utilized in matching features involves comparing a small group of pixels including the feature pixel and those surrounding it, namely pixel group 406. In this example, a nine-pixel group has been selected. The selected pixel group can be compared with every nine-pixel grouping in the other image and the best match determined statistically. A significantly less computationally intensive algorithm is used with calibrated systems that contain known epipolar lines. In one embodiment, the epipolar lines are mapped onto the horizontal scan lines. In this example, the pixel group only needs to be compared to the nine-pixel groups in the other image along the matching scan line 405.

For pixel group 406, there are possible 5 matches in scan line 405. The system will either determine there are multiple matches and discard the pixel as a possible feature, which decreases the useable features in the image or incorrectly correlate the feature between images yielding an incorrect scene analysis.

Figure 5:
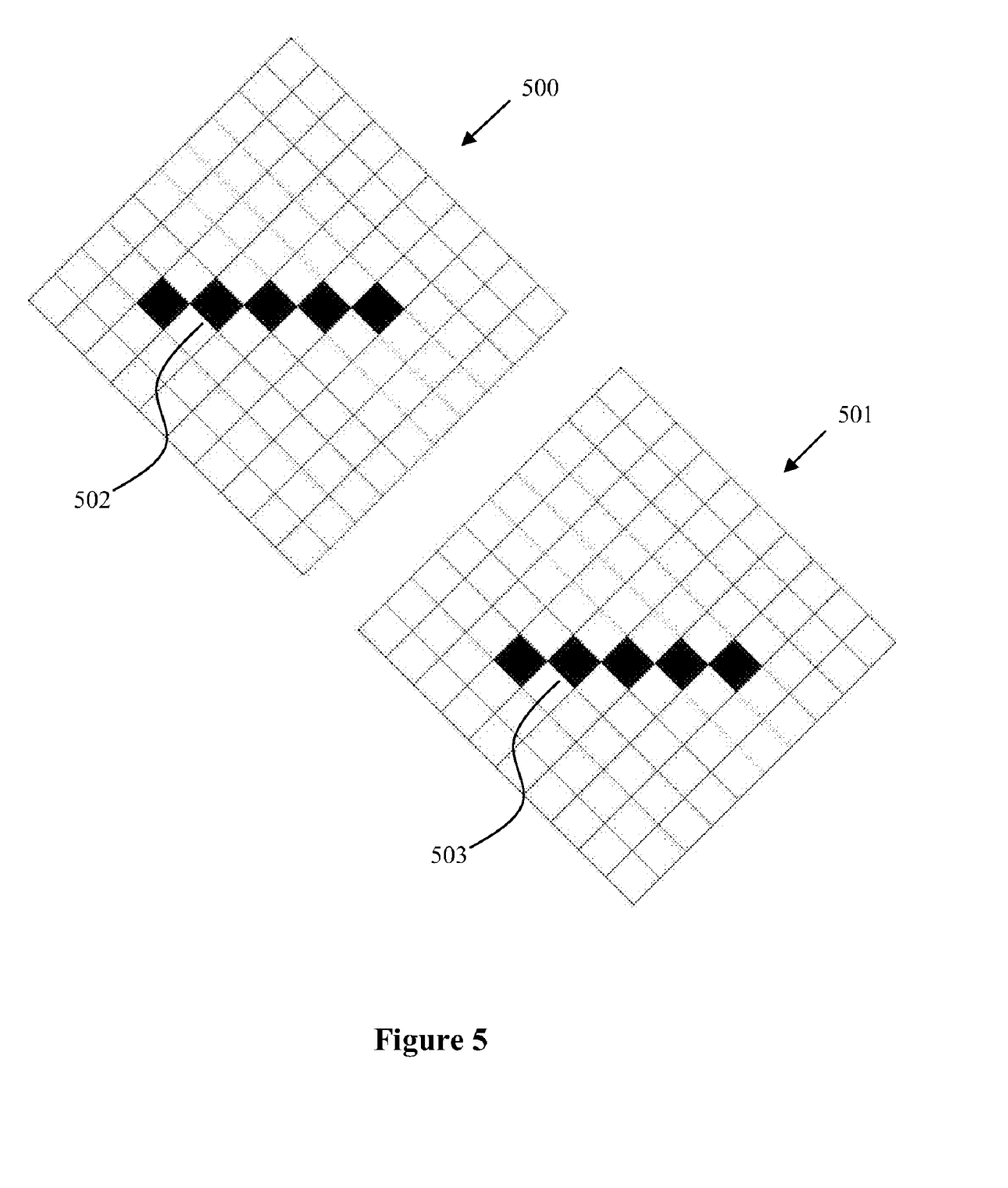
FIG. 5 shows image pixels of a horizontal line taken by a stereovision robot employing an angled axial alignment.
Figure 6:
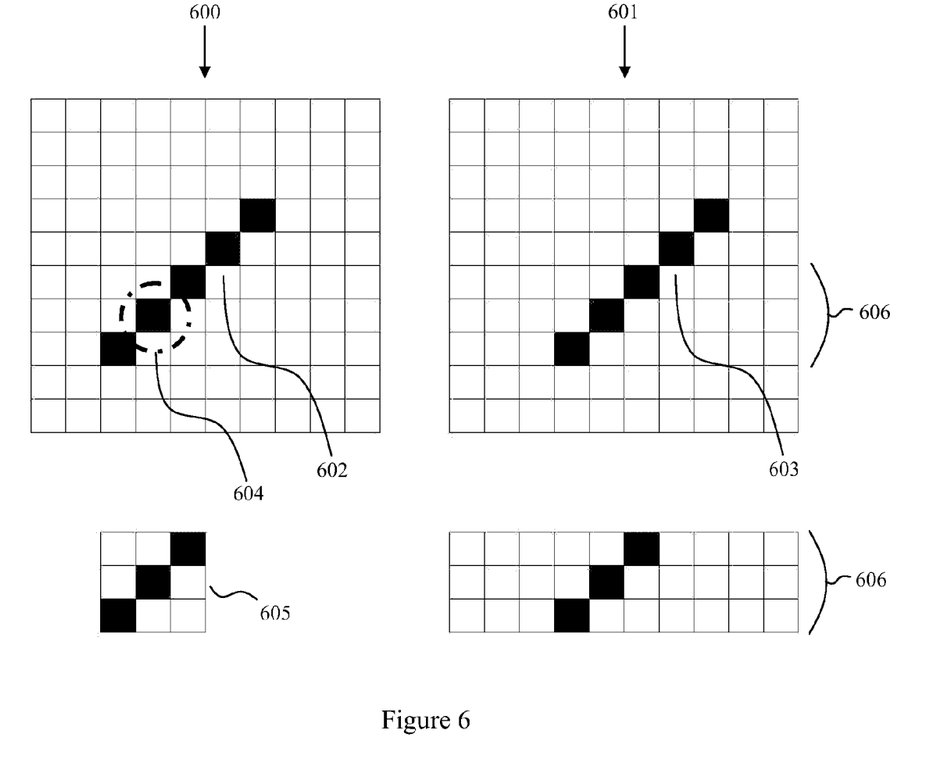
FIG. 6 shows the image pixels of FIG. 5 rotated 45-degrees ready for analysis.

FIG. 5 shows left image 500 and the right image 501 the same horizontal line 502 and 503 when viewed by an embodiment of the invention employing an axial angled camera system angled for example at 45 degrees from the horizontal as shown in FIG. 1B. A horizontal line in the environment in this set of pictures shows up at an angle with respect to the axis defined by the camera centers. The line is only 5 pixels long (the diagonal of the pixel is 1.4 times the length of either side). For ease of discussion, FIG. 6 shows the same image pair rotated 45 degrees to horizontal for simplified visualization and analysis. The line 602 in the left image 600 is shifted one pixel to the left when compared to the same line 603 in the right image 601. Pixel 604 has been selected as a feature for correlation.

Pixel group 605 in the left image is compared to the pixel groups along the corresponding scan line 606 in the right image. In this case there is a single possible correlation resulting in an accurate scene analysis. In addition, each pixel in the line can be correctly mapped between the left and right images increasing the amount of detail useable for scene analysis. In some scenes, the potential features increases by 50% or more. In indoor environments comprising many vertical and horizontal lines this increase in accuracy of distance measurements is of great advantage.

Figure 7:
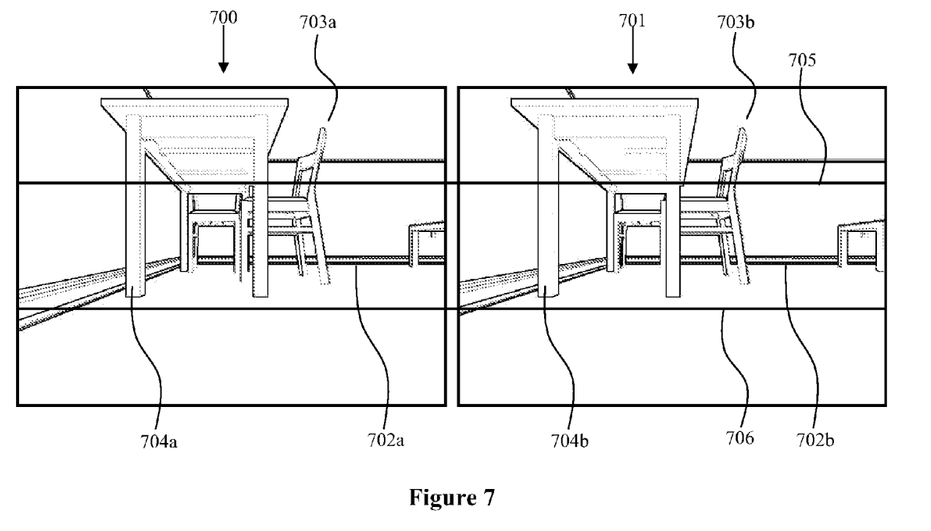
FIG. 7 shows images of a room taken by a stereovision system employing a standard horizontal camera alignment

FIG. 7 shows a typical indoor room viewed by a stereo camera system with a horizontal alignment. Left image 700 and right image 701 show virtually the same scene with the image shifted slightly sideways between the two. In the image it is possible to see baseboard 702a and 702b, table 704a and 704b and chair 703a and 703b. Two representative epipolar lines 705 & 706 are shown for reference. In the image, it is obvious that many of the natural lines are either horizontal or nearly so, which severely inhibits the ability to analyze the scene using the configuration shown in FIG. 1A. With a horizontal configuration, the baseboard, table top, chair leg supports and seat are unusable.

Figure 8:
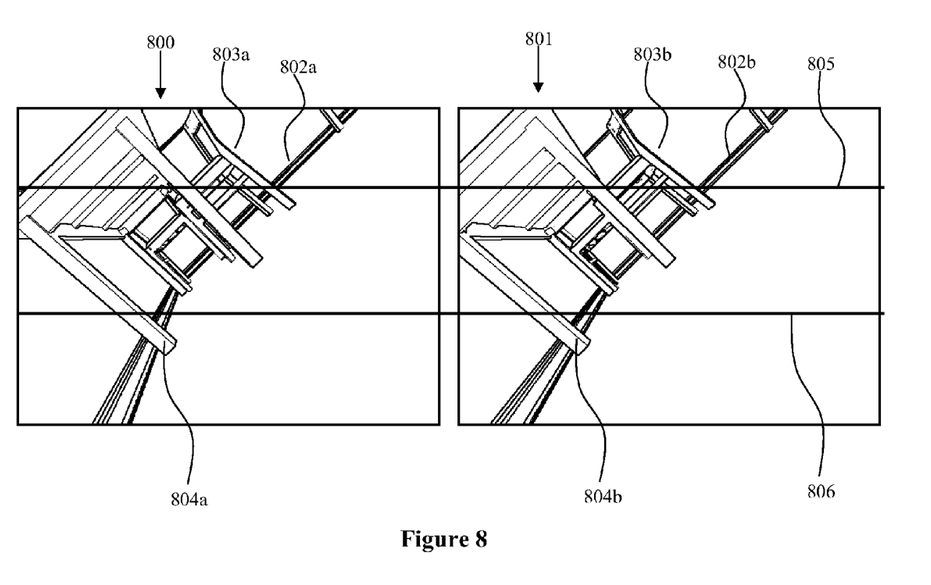
FIG. 8 shows images of a room showing taken by stereovision system employing a 45-degree camera alignment.

FIG. 8 shows the same indoor room viewed by a stereo camera system with for example a 45-degree angle alignment. The left image 800 and the right image 801 also show virtually the same scene with the image shifted slightly sideways between the two. Baseboard 802a and 802b, table 804a and 804b and chair 803a and 803b are still visible. Two representative epipolar lines 805 and 806 are shown for reference. In this scene it is apparent that few of the natural lines are parallel or nearly parallel to the epipolar lines, so the machine vision system can make an accurate three-dimensional analysis of the scene.

One application for a stereovision system is mobile robotics. Mobile robots use cameras for mapping and navigating within their surrounding environment. A larger number of features enables a mobile robot to create a better map and to better keep track of the feature locations within the map. Rotation of the camera mount in environments comprising lines roughly parallel with the axis of the camera set may be performed in order to garner more accurate distance calculations. Taking a second set of pictures after rotating the camera mount can be used to eliminate a set of images from use in distance estimates or to correlate distances taken from a plurality of sets of images. This is possible when the camera mount is rotatably mounted to an object, for example a mobile robot.

Thus embodiments of the invention directed to an Angled Axis Machine Vision System and Method have been exemplified to one of ordinary skill in the art. The claims, however, and the full scope of any equivalents are what define the metes and bounds of the invention.

What is claimed is:

1. A system for calculating distances to objects within three-dimensional space in an environment comprising horizontal and vertical lines using an angled axis machine vision system comprising:
   a first camera;
   a second camera mounted coplanar to said first camera wherein said first camera and said second camera comprise collinear horizontal center lines;
   a camera mount coupled with said first camera and said second camera wherein said camera mount is at a rotation of a first axial angle with between 0 and 90 degrees about a roll axis defined as parallel to ground; and,
   a computer configured to perform a distance calculation wherein said computer is coupled with said first camera and said second camera and configured to calculate a distance based on a first picture obtained from said first camera and a second picture obtained from said second camera to a feature found along an epipolar line parallel to said collinear horizontal center lines and wherein said first axial angle is selected to differ from horizontal and vertical lines at 0 and 90 degrees respectively in an environment to increase useable detail and minimize errors in said distance calculation.

2. The system of claim 1 wherein said first axial angle is substantially 45 degrees.

3. The system of claim 1 wherein said first axial angle is substantially 37 degrees.

4. The system of claim 1 wherein said first axial angle is substantially 29 degrees.

5. The system of claim 1 wherein said camera mount is rotated in a second axial angle between 0 and 90 degrees about a pitch axis defined as parallel to an axis that runs through said first camera and said second camera and orthogonal to said roll axis.

6. A method for calculating distances to objects within three-dimensional space in an environment comprising horizontal and vertical lines using an angled axis machine vision system comprising:
   attaching a first camera and a second camera to a camera mount wherein said first camera and said second camera comprise collinear horizontal center lines;
   rotating said camera mount in a first axial angle to a rotation between 0 and 90 degrees about a roll axis defined as parallel to ground;
   obtaining a first picture from said first camera;
   obtaining a second picture from said second camera; and,
   calculating a distance using said first picture obtained from said first camera and said second picture obtained from said second camera to a feature found along an epipolar line parallel to said collinear horizontal center lines by selecting said first axial angle to differ from horizontal and vertical lines at 0 and 90 degrees respectively in an environment to increase useable detail and minimize errors in said distance calculation.

7. The method of claim 5 wherein said first axial angle is substantially 45 degrees.

8. The method of claim 5 wherein said first axial angle is substantially 37 degrees.

9. The method of claim 5 wherein said first axial angle is substantially 29 degrees.

10. The method of claim 5 further comprising:
rotating said camera mount in a second axial angle between 0 and 90 degrees about a pitch axis defined as parallel to an axis that runs through said first camera and said second camera and orthogonal to said roll axis.

* * * * *